US012771693B2

(12) United States Patent

O'Sullivan et al.

(10) Patent No.: US 12,771,693 B2
(45) Date of Patent: *Oct. 20, 2026

(54) SYSTEM, DEVICE AND METHOD FOR PROVIDING PASSENGER OR USER INFORMATION

(71) Applicant: SITA INFORMATION NETWORKING COMPUTING UK LIMITED, Hayes (GB)

(72) Inventors: Kevin O'Sullivan, Hove (GB); Jim Peters, Atlanta, GA (US)

(73) Assignee: SITA Information Networking Computing UK Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,863

(22) Filed: Dec. 23, 2024

(65) Prior Publication Data

US 2025/0126122 A1 Apr. 17, 2025

Related U.S. Application Data

(63) Continuation of application No. 18/339,807, filed on Jun. 22, 2023, now Pat. No. 12,212,570, which is a (Continued)

(51) Int. Cl.
*G06F 7/00* (2006.01)
*G06F 16/2455* (2019.01)
(Continued)

(52) U.S. Cl.
CPC ........ *H04L 63/10* (2013.01); *G06F 16/24564* (2019.01); *G06F 16/2458* (2019.01);
(Continued)

(58) Field of Classification Search
CPC ........... G06F 16/24564; G06F 16/2458; G06F 16/00; G06F 21/10; H04L 63/10;
(Continued)

(56) References Cited

U.S. PATENT DOCUMENTS 4,642,775 A * 2/1987 Cline ..................... G01C 23/00 702/3
5,361,203 A * 11/1994 Hiyama ................. G16H 30/20 385/117

(Continued)

FOREIGN PATENT DOCUMENTS

CN 1467642 A 1/2004
CN 105389319 A 3/2016

(Continued)

OTHER PUBLICATIONS

International Preliminary Report on Patentability for International Application No. PCT/GB2018/051354, mailed Nov. 28, 2019, 08 Pages.

(Continued)

*Primary Examiner* — Mohammed R Uddin
(74) *Attorney, Agent, or Firm* — Bradley Arant Boult Cummings LLP; Adam J. Thompson, Esq.; Daniel E. Sineway, Esq.

(57) ABSTRACT

A computer processing device for determining whether to allow or deny access to a database associated with the device is provided. The device is configured to determine the origin of data signed with a first key by comparing the key to one or more keys stored in a further database to identify the source of the data; search the database to determine one or more access rules associated with the source of the data, wherein the access rules define whether write access to the database is allowed or denied for the data; and allow or deny write access to the database based on the determined rule or rules.

19 Claims, 8 Drawing Sheets

Related U.S. Application Data continuation of application No. 16/614,739, filed as application No. PCT/GB2018/051354 on May 18, 2018, now Pat. No. 11,700,254.

(60) Provisional application No. 62/508,610, filed on May 19, 2017.

(51) Int. Cl.

| | |
|---|---|
| ***G06F 16/2458*** | (2019.01) |
| ***G06F 21/10*** | (2013.01) |
| ***H04L 9/08*** | (2006.01) |
| ***H04L 9/12*** | (2006.01) |
| ***H04L 9/40*** | (2022.01) |
| ***H04W 12/082*** | (2021.01) |

(52) U.S. Cl.

CPC .............. *G06F 21/10* (2013.01); *H04L 9/083* (2013.01); *H04L 9/088* (2013.01); *H04L 9/12* (2013.01); *H04W 12/082* (2021.01)

(58) Field of Classification Search

CPC ........... H04L 9/083; H04L 9/088; H04L 9/12; H04W 12/082

See application file for complete search history.

(56) References Cited

U.S. PATENT DOCUMENTS 5,576,951 A * 11/1996 Lockwood ......... G06Q 30/0625 705/26.81
5,924,074 A * 7/1999 Evans .................... G16H 20/10 707/999.001
6,003,009 A * 12/1999 Nishimura ............. G06Q 10/02 705/5
6,542,796 B1 * 4/2003 Gibbs ...................... G08G 5/32 701/14
6,631,384 B1 * 10/2003 Richman ............. G06F 16/2477
6,934,717 B1 * 8/2005 James ...................... G06F 16/10
7,203,660 B1 * 4/2007 Majeed .............. G06Q 30/0641 705/14.1
7,233,940 B2 * 6/2007 Bamberger ........... G06F 11/006 707/999.102
7,394,900 B1 * 7/2008 Gerber ................ G06F 21/6263 380/259
7,802,724 B1 * 9/2010 Nohr ........................ G07C 9/28 235/384
7,865,420 B1 * 1/2011 Daman .................. G06Q 30/08 705/37
8,316,237 B1 * 11/2012 Felsher ................. H04L 63/061 380/282
8,497,803 B1 * 7/2013 Baker ................. G06F 21/6218 342/454
8,600,784 B1 * 12/2013 Ivey ........................ G06F 16/00 705/5
8,886,446 B1 * 11/2014 Baiada ................... G06Q 50/40 701/122
9,076,327 B1 * 7/2015 Baiada ..................... G08G 5/76
9,153,138 B1 * 10/2015 Jewett ...................... G08G 5/30
10,679,153 B2 * 6/2020 Casado ................ G06Q 10/025
11,195,598 B2 * 12/2021 Pait ......................... G16Z 99/00
12,483,586 B1 * 11/2025 Lait ..................... H04L 63/1433
12,483,957 B2 * 11/2025 Kim .................... H04W 36/185
2002/0143588 A1 * 10/2002 Ishigami .................. G07C 9/22 705/5
2002/0147767 A1 * 10/2002 Brice ..................... G06Q 30/02 709/203
2003/0033084 A1 * 2/2003 Corcoran, III .......... G01S 19/17 701/300
2003/0130770 A1 * 7/2003 Matos ................ H04B 7/18506 701/3
2003/0172175 A1 * 9/2003 McCormack ......... H04L 67/303 709/232
2004/0054550 A1 * 3/2004 Cole .................. G06Q 10/0639 705/13
2005/0071076 A1 * 3/2005 Baiada ...................... G08G 5/56 701/120
2006/0206363 A1 * 9/2006 Gove ................... G06Q 10/025 705/6
2007/0124180 A1 * 5/2007 Takeuchi ............... G06Q 90/00 705/5
2007/0239791 A1 10/2007 Cattell et al.
2008/0262878 A1 * 10/2008 Webby ................... G06Q 10/02 705/5
2010/0031349 A1 * 2/2010 Bingham ................ G06F 21/31 726/20
2010/0106514 A1 * 4/2010 Cox ....................... G01C 21/20 715/764
2011/0087561 A1 * 4/2011 Cormack ............... G06Q 30/02 705/27.1
2011/0133892 A1 * 6/2011 Nohr ........................ G07C 9/28 340/10.1
2011/0166898 A1 * 7/2011 Zarrow .................. G06Q 10/02 707/769
2011/0251863 A1 * 10/2011 Singer .................. G06Q 10/025 705/6
2012/0072249 A1 * 3/2012 Weir ...................... G06Q 10/00 705/5
2012/0177198 A1 * 7/2012 Cabos ................. H04L 63/0428 380/270
2012/0191333 A1 * 7/2012 Sawhill .................... G08G 5/53 701/122
2012/0215434 A1 * 8/2012 Subbu ...................... G08G 5/26 701/120
2012/0218127 A1 * 8/2012 Kroen ...................... G08G 5/53 340/945
2012/0239824 A1 * 9/2012 Nguyen .................. H04L 51/56 709/246
2013/0028174 A1 * 1/2013 Cabos ................... H04L 51/063 370/316
2013/0080043 A1 * 3/2013 Ballin ...................... G08G 5/32 701/120
2013/0117057 A1 * 5/2013 Van Moltke ....... G01C 21/3415 705/7.13
2013/0159021 A1 * 6/2013 Felsher .................. G16H 10/60 705/3
2013/0304508 A1 11/2013 Shah
2014/0089588 A1 3/2014 Redoutey
2014/0298185 A1 * 10/2014 Chen ..................... G06F 16/958 715/738
2014/0344374 A1 * 11/2014 Attar ................... H04L 12/1859 709/206
2015/0286984 A1 * 10/2015 Dikman ............... G06Q 10/087 705/28
2015/0379009 A1 * 12/2015 Reddy ................. G06F 16/2343 707/747
2016/0093217 A1 * 3/2016 Hale ........................ G08G 5/76 701/120
2016/0180715 A1 * 6/2016 Burke ...................... G08G 5/21 701/467
2016/0352412 A1 * 12/2016 Di Costanzo ...... H04N 21/2146
2017/0083907 A1 3/2017 McDonough
2017/0097959 A1 * 4/2017 Nachiappan ........ G06F 16/2455
2017/0116206 A1 * 4/2017 Gumerato ............. G06F 16/275
2017/0126702 A1 5/2017 Krishnamurthy
2017/0300627 A1 * 10/2017 Giordano ............ G06F 21/6245
2018/0039667 A1 * 2/2018 Pierce ................... H04L 9/3247
2018/0062848 A1 * 3/2018 Gorman ................ H04L 9/3247
2018/0260741 A1 * 9/2018 Lamoureux ............ G06Q 30/06
2018/0315323 A1 * 11/2018 Winkler .................. H04L 69/00
2020/0110751 A1 * 4/2020 O'Sullivan ............. H04L 9/088
2020/0211305 A1 * 7/2020 Bender .................... G06N 5/02
2022/0230322 A1 * 7/2022 Dong ..................... G06N 3/048
2023/0030829 A1 * 2/2023 Moon ................... H04L 9/0894
2023/0037657 A1 * 2/2023 Sachson .................. G06F 21/10

(56) References Cited

U.S. PATENT DOCUMENTS

| | | | | |
|---|---|---|---|---|
| 2023/0401274 | A1* | 12/2023 | Denninghoff | G06Q 30/0251 |
| 2025/0299255 | A1* | 9/2025 | Cella | G06N 20/00 |

FOREIGN PATENT DOCUMENTS

| | | | |
|---|---|---|---|
| CN | 106063188 | A | 10/2016 |
| JP | H09134500 | A | 5/1997 |
| JP | 2003058657 | A | 2/2003 |
| JP | 2008210373 | A | 9/2008 |
| WO | 2012131765 | A1 | 10/2012 |
| WO | 2016102590 | A1 | 6/2016 |

OTHER PUBLICATIONS

Non-Final Office Action for U.S. Appl. No. 18/339,807, mailed Jun. 6, 2024, 25 Pages.
Notice of Allowance for the U.S. Appl. No. 18/339,807, dated Oct. 1, 2024, 08 pages.
International Search Report and Written Opinion issued in International Application No. PCT/GB2018/051354, mailed on Jul. 3, 2018.

* cited by examiner

UPDATE arrival.estimated 2017-05-19T09:35:00+02:00

Genève Aèroport
0x42866c4341ecb2ceaa955719bbe7a26c7246c712

Block 0x3a0e3039dbec37...46ae151d68

Transaction 0xb19d5d6f49d36...478649f95e

UPDATE_ERROR: NOT _AUTHORIZED_DEPARTURE ("DEPARTURE.ACTUAL")

19T07:09:00+01:00

Genève Aèroport
0x42866c4341ecb2ceaa955719bbe7a26c7246c712

Block 0x09d4c976cf550d...4503797602

Transaction 0x92e17591b4cacd...2ad7095966

UPDATE departure.actual 2017-05-19T06:43:00+01:00

British Airways
0x1b4910600791b62e30ec280b44802ecb7e81b2c2

Block 0x776ea927403933...c55d723ea4

Transaction 0xc2c456b099e6e74...d6a83efa0e

UPDATE_ERROR: NOT _AUTHORIZED_DEPARTURE ("DEPARTURE.ACTUAL")

19T07:09:00+01:00

Genève Aèroport
0x42866c4341ecb2ceaa955719bbe7a26c7246c712

Block 0xc3e20adc0389da...3530c440e7

Transaction 0x2a11e61053fc0a...dd0bc845d0

UPDATE departure.actual 2017-05-19T06:43:00+01:00

British Airways
0x1b4910600791b62e30ec280b44802ecb7e81b2c2

Block 0xd02c0d585c8edd...2e0cb0f786

Transaction 0x1c0b932bedcbdc...df901dd362

UPDATE_ERROR: NOT _AUTHORIZED_DEPARTURE ("DEPARTURE.ACTUAL")

*FIG. 3*

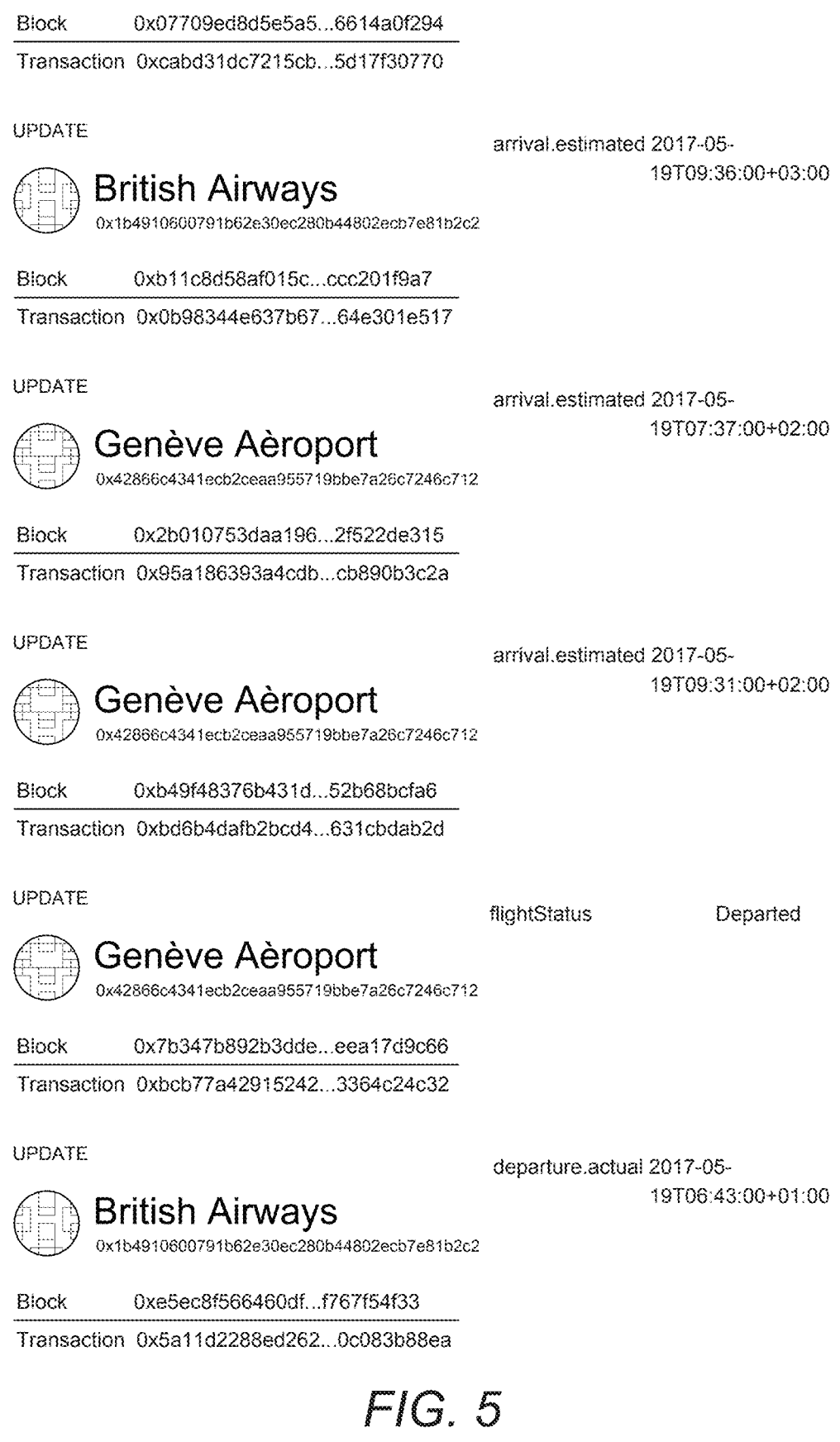

Block 0x07709ed8d5e5a5...6614a0f294

Transaction 0xcabd31dc7215cb...5d17f30770

UPDATE

British Airways
0x1b4910600791b62e30ec280b44802ecb7e81b2c2 arrival.estimated 2017-05-19T09:36:00+03:00

Block 0xb11c8d58af015c...ccc201f9a7

Transaction 0x0b98344e637b67...64e301e517

UPDATE

Genève Aèroport
0x42866c4341ecb2ceaa955719bbe7a26c7246c712 arrival.estimated 2017-05-19T07:37:00+02:00

Block 0x2b010753daa196...2f522de315

Transaction 0x95a186393a4cdb...cb890b3c2a

UPDATE

Genève Aèroport
0x42866c4341ecb2ceaa955719bbe7a26c7246c712 arrival.estimated 2017-05-19T09:31:00+02:00

Block 0xb49f48376b431d...52b68bcfa6

Transaction 0xbd6b4dafb2bcd4...631cbdab2d

UPDATE

Genève Aèroport
0x42866c4341ecb2ceaa955719bbe7a26c7246c712 flightStatus Departed

Block 0x7b347b892b3dde...eea17d9c66

Transaction 0xbcb77a42915242...3364c24c32

UPDATE

British Airways
0x1b4910600791b62e30ec280b44802ecb7e81b2c2 departure.actual 2017-05-19T06:43:00+01:00

Block 0xe5ec8f566460df...f767f54f33

Transaction 0x5a11d2288ed262...0c083b88ea

*FIG. 5*

UPDATE

Genève Aèroport
0x42866c4341ecb2ceaa955719bbe7a26c7246c712 arrival.estimated 2017-05-19T09:25:00+02:00

| | |
|---|---|
| Block | 0x47dcff7cfc0ea8...05b7ff4233 |
| Transaction | 0x9d92e14effce1c...b0aff75535 |

UPDATE

Genève Aèroport
0x42866c4341ecb2ceaa955719bbe7a26c7246c712 arrival.estimated 2017-05-19T09:33:00+02:00

| | |
|---|---|
| Block | 0x2efc0b3cd73ce3...769210c51b |
| Transaction | 0xa103df146a7ba8...5cdd162aaf |

UPDATE

British Airways
0x1b4910600791b62e30ec280b44802ecb7e81b2c2 arrival.estimated 2017-05-19T09:25:00+02:00

| | |
|---|---|
| Block | 0xc29c857cbe0811...0039bc1a1d |
| Transaction | 0x546cdc917822ec...ff59ecfbf3 |

UPDATE

British Airways
0x1b4910600791b62e30ec280b44802ecb7e81b2c2 departure.gate B38

| | |
|---|---|
| Block | 0xb7172e6b410dc3...974329ca4a |
| Transaction | 0xb4a6372f9b5562...f22e846f01 |

UPDATE_ERROR: INVALID_FIELD_PRESENT ("PASSENGERS.FIRST")

British Airways
0x1b4910600791b62e30ec280b44802ecb7e81b2c2

| | |
|---|---|
| | 1 |
| passengers.business | 10 |
| passengers.economy | 100 |
| passengers.wheelchair | 3 |

| | |
|---|---|
| Block | 0x0857b436491d88...28fdd902ad |
| Transaction | 0x21552acaf958e8...4c0136f283 |

UPDATE_ERROR: NOT_AUTHORIZED_DEPARTURE ("DEPARTURE.ESTIMATED")

*FIG. 6* departure.estimated 2017-05-19T06:40:00+01:00

Genève Aèroport

0x42866c4341ecb2ceaa955719bbe7a26c7246c712

| | |
|---|---|
| Block | 0x97bd78f0db7098...b28b142e95 |
| Transaction | 0xef34164fdffd09...d6c2b77944 |

CREATION

London Heathrow

0x3241e1f77308d839117c84f945902485eb5b518d

| | |
|---|---|
| Block | 0xce7d69717c08d5...a6ebe44d6c |
| Transaction | 0xbc25ef0fad66a9...7f6f877fba |

| | |
|---|---|
| operatingAirline.icaoCode | BAW |
| operatingAirline.mane | British Airways |
| aircraftType.icaoCode | A319 |
| aircraftType.modelName | 319 |
| arrivalAirport | GVA |
| departure.scheduled | 2017-05-19T06:45:00+01:00 |
| departure.estimated | 2017-05-19T06:45:00+01:00 |
| departure.terminal | 5 |
| arrival.scheduled | 2017-05-19T09:20:00+02:00 |
| arrival.estimated | 2017-05-19T09:33:00+02:00 |
| arrival.terminal | 1 |
| flightStatus | Scheduled |
| originDate | 2017-05-19 |
| departureAirport | LHR |
| operatingAirline.iataCode | BA |
| flightNumber.airlineCode | BA |
| flightNumber.trackNumber | 0724 |

*FIG. 7*

SYSTEM, DEVICE AND METHOD FOR PROVIDING PASSENGER OR USER INFORMATION

CROSS-REFERENCE TO RELATED CASES

This application is a continuation of U.S. patent application Ser. No. 18/339,807, filed Jun. 22, 2023 and entitled "SYSTEM, DEVICE AND METHOD FOR PROVIDING PASSENGER OR USER INFORMATION," which is a continuation of U.S. patent application Ser. No. 16/614,739, now U.S. Pat. No. 11,700,254, filed Nov. 18, 2019, and entitled "SYSTEM, DEVICE AND METHOD FOR PROVIDING PASSENGER OR USER INFORMATION," which is a national phase entry of, and claims the benefit of and priority to, International Patent App. No. PCT/GB2018/051354, filed May 18, 2018, and entitled "SYSTEM, DEVICE AND METHOD FOR PROVIDING PASSENGER OR USER INFORMATION," which claims the benefit of and priority to U.S. Provisional Application No. 62/508,610, filed May 19, 2017, and entitled "SYSTEM AND APPARATUS FOR RESOURCE MANAGEMENT," each of which are incorporated by reference in their entireties herein.

FIELD OF THE INVENTION

This invention relates to a system, apparatus, method or computer program for providing passenger or user information or data. More particularly, this invention relates to a system, device and method for aggregating data from a number of different sources. The information is usually provided to a passenger, a security agent, an airline agent, or other agent at an airport or other transportation hub such as a railway station, or bus station.

BACKGROUND OF THE INVENTION

In the air transport industry, the status of a flight is always in flux, and multiple data sources are required to accurate identify the status of a flight. The status of a flight may include:

- The scheduled departure/arrival times.
- Estimated and Actual departure/arrival times
- The departure gate and terminal at the airport
- The arrival gate and terminal at the airport
- The baggage carousel number at the arrival airport
- Alpha-numeric data displayed on a screen display at an airport, such as "DELAYED", "GO TO GATE", "BOARDING", "CLOSING" etc.
- The aircraft type and tail number.

For any given flight, going from airport A to airport B, some of this data is provided exclusively by the airline, some of this data is provided exclusively by airport A and some of this data is provided exclusively by airport B. In addition to that other agencies can be involved in updating this data, such as Air Traffic Control.

Each airline and airport usually have their own database of flight operational data. These are not always consistent and this results in inconsistent data and there is no "single version of the truth". It is important for the industry to have a single consistent view of all data of all flights. Without this there is confusion when managing airport operations, airline operations and when communicating with customers.

SUMMARY OF THE INVENTION

The invention is defined in the appended claims to which reference should now be made.

Embodiments of the invention seek to address the above problems by providing a computer processing device for determining whether to allow or deny access to a database or a storage means associated with the device, the device comprising: receiving means for receiving data in particular status information, wherein the data is signed with a key; wherein the device is comprises means for or is configured to determine the origin of the data by comparing the key to one or more keys stored in the database or storage means, to identify the source of the data; search the database or storage means to determine one or more access rules associated with the source of the data, wherein the access rules define whether write access to the database or storage means is allowed or denied for the data. Preferably, the device allows or denies write access to the database or storage means based on the determined rule or rules. Usually, the receiving means is a receiver.

Embodiments of the invention seek to address the above problems by providing a computer processing device for determining status information associated with a journey between an origin, A, and destination, B, the device comprising a first adapter configured to determine a security key and to receive first status information associated with a data source, origin, or destination. The origin may for example be an airport such as London Heathrow, LHR, while the destination, may for example also be an airport such as Miami International Airport.

Embodiments of the invention seek to address the above problems by providing a system for data processing comprising processing means configured to: determine from a first data set associated with a first data source, a first unique key associated with the first data source wherein the first data set comprises a plurality of different first data elements; determine from a second data set associated with a second data source, a second unique key associated with the second data source wherein the second data set comprises a plurality of different second data elements, wherein the first data set and second data set share at least one common data element and wherein at least some of the first data elements are different from the second data elements. Preferably, the first data source and second data source are verified based on the keys. More preferably, the system combines the first data set and second data set in to an aggregated data set if each data source is verified as the source of the data.

Embodiments of the invention retrieve data from a database, the data identified by a unique key. Data in the database may be updated based on one or more write permission rules. Usually, different rules are provided based on whether the status information originates from or is associated with a departure airport or arrival airport or airline. Each adapter may push data into node or processing device running a smart contract which comprises code which signs the data with a private key.

Embodiments of the invention provide an industry centric flight information service which aggregates all data about all flights and rationalises this sometimes conflicting data into a single data set per flight, and then stores this on a Distributed Leger Technology, DLT. All participants in the system can operate a node of the DLT and therefore have the accurate data replicated on their system continuously.

This has the benefit of providing a complete view of the flight, not just a single airport centric view, and also a view of flight information from authoritative sources. Also, through the use of a Smart Contract to merge data and DLT to distribute the data, every user on the system can be confident that they are all viewing the same information.

BRIEF DESCRIPTION OF THE DRAWINGS

An embodiment of the invention will now be described, by way of example only, and with reference to the accompanying drawings, in which:

FIG. 3 shows exemplary status information and sources of data;

FIG. 5 shows exemplary status information and sources of data;

FIG. 6 shows exemplary status information and sources of data;

FIG. 7 shows exemplary status information and sources of data;

DETAILED DESCRIPTION

The following description is of a system for use in the aviation industry, but this is exemplary and other applications of the invention will also be discussed. For example, the system may be used in other travel industries, such as rail, coach, car, or indeed in any environment where information from a number of different sources needs to be aggregated.

Additionally, the following embodiments described may be implemented using a C++ programming language using for example an OpenCV library. However, this is exemplary and other programming languages known to the skilled person may be used such as JAVA, and .xml.

Figure 1:
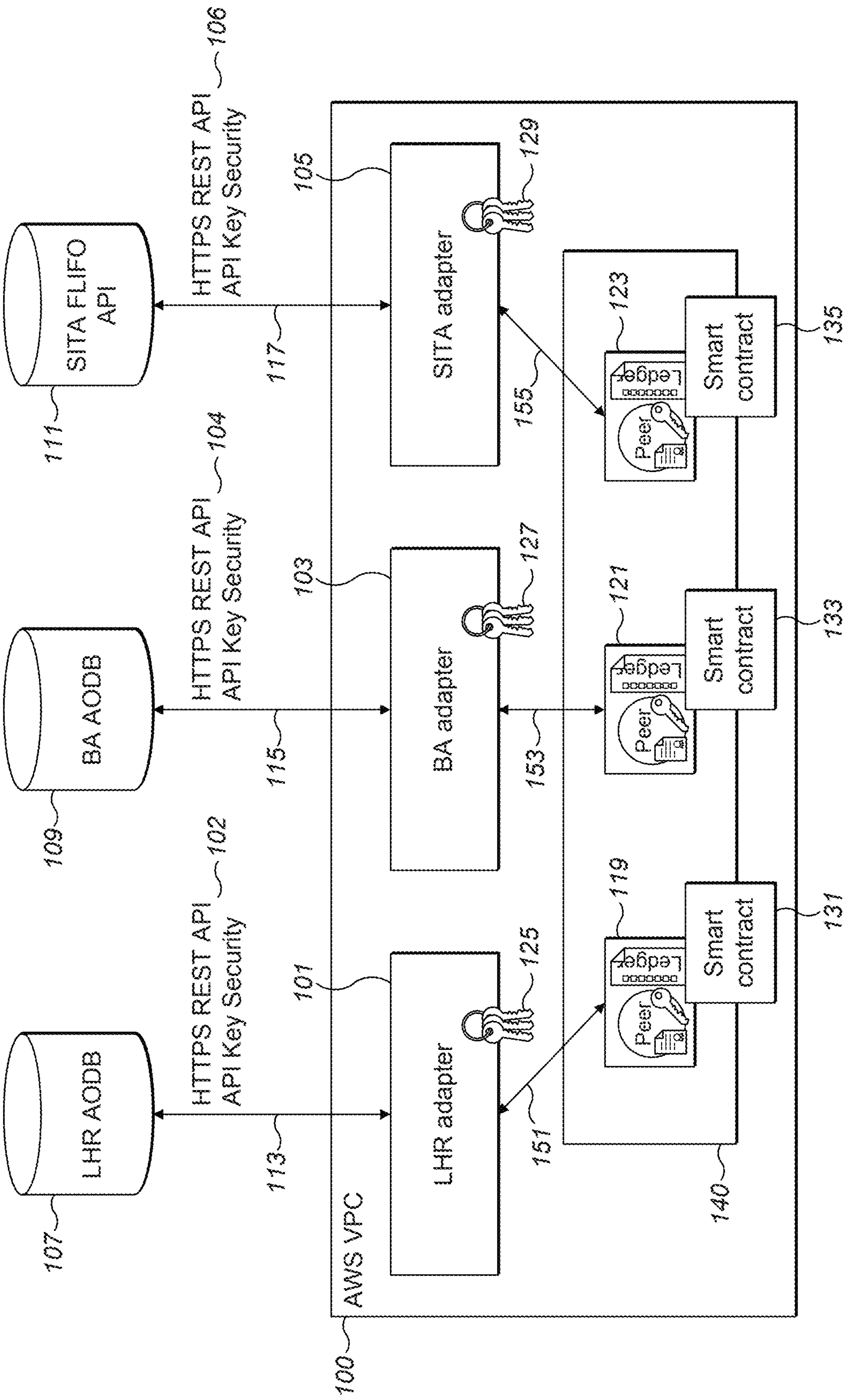
FIG. 1 is a schematic diagram of the main functional components embodying the invention.

Turning to FIG. 1, usually, the functional components shown within label 100 in FIG. 1 are embodied within a virtual private cloud. Access to the cloud is secured by username and password. Usually, the cloud is provided on one or more computers or servers. One specific example of a cloud which may embody functional aspects of this invention is an Amazon™ Web Services cloud or Virtual Private Cloud. In this, different IP address ranges may be selected, subnets may be created, route tables and network gateways may be configured.

The system may comprise any one or more of one or more adapters 101, 103, 105. Each adapter 101, 103, 105 is communicatively coupled to a respective database 107, 109, 111. Usually, each adapter polls one of the databases on a periodic basis, for example every minute. Alternatively, the databases may push data up to each adapter 101, 103, 105.

Usually, access to each database is provided by a key, such as API security Keys 102, 104, 106. Usually, keys 102, 104, and 106 are the same keys, but in principle they may be different. Usually, the coupling of each respective adapter, such as 101 to the database 107 is via wired or wireless communication means 113, 115, 117 which will be known to the skilled person, such as HTTPS.

Furthermore, each adapter 101, 103, 105 is communicatively coupled to a Distributed Ledger Technology (DLT) Node, 119, 121, 123. Once again, the coupling of each adapter, such as adapter 101 to a respective DLT node is usually via wired or wireless communication means which will be known to the skilled person. Usually, access to each node 119, 121, 123 is secured by way of a respective key, 125, 127, 129. Keys 125, 127, 129 are either public or private encryption keys. Usually each of the keys 125, 127, 129 are different and each may be associated with a particular airline or airport. Each key May allow a particular airline or airport, or in other words the source of the data to be uniquely identified and/or verified. In this way, each data source may be determined as genuine, or authenticated. Arrows 151, 153, 155 in FIG. 1 are schematic arrows representing a wired or wireless communication channel between each peer or node 119, 121, 123 and a respective adapter 101, 103, 105. This may be according to a Hyper Text Transfer Protocol Secure, (HTTPS).

Flight Information, FLIFO, Data Structure

The data elements for flight status is well established and there are many different standards available. Embodiments of the invention may use the ACRIS™ Seamless Travel data standard which is a standard agreed on by bodies such as ACIT™, IATA™, and SITA™.

This standard may contain or in other words comprise any one or more of the elements listed below, and are grouped by the entity which can send updates to this information. Usually, this data is in an alpha numeric format with a syntax element or field defining the data type and an associated value, usually also in an alpha numeric format or string.

Airline Data (that is data that only an airline can define).
Operating Airline
Operating Flight Number.
Marketing Airline(s)
Marketing Flight Numbers(s).
Departure Airport.
Arrival Airport.
Scheduled departure/arrival time.
Airport data (that is data that only the airport can determine).
Departure Gate.
Arrival Gate.
Check in desk(s)
Baggage carousel
FIDS Display Text (BOARDING, CLOSING, GO TO GATE, WAIT IN LOUNGE etc.)
Airline/Airport data (these are data elements that both airline and airport can determine)
Estimated departure/arrival time
Actual departure/arrival time Some of these data elements are shown in FIGS. 2 to 7 of the drawings.

FLIFO Events

These are some of the events during the lifecycle of a flight which may impact the flight information data:

Airline publishes Schedule
Departure Airport assigns check in desks, departure gate
Arrival Airport assigns arrival gate and baggage carousel Further, any combination of the following events may impact the flight information:

Crew late to flight, or are sick and require replacement crew
Passengers are late to board and bags need to be offloaded
Congestion at departure or arrival airport
Gate not available on arrival Air Traffic Control delays flight It is important to note that this is just a small sample of the types of events that can trigger updates to the flight status, and that the flight status data can be updated continuously throughout the life of the flight.

System Operation

Figure 8:
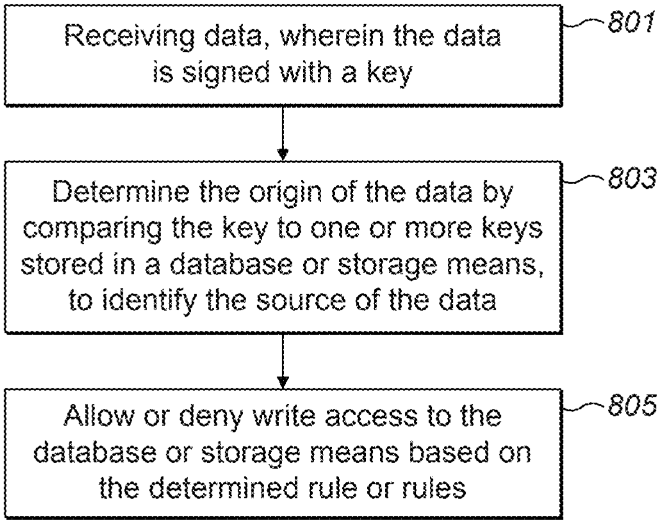
FIG. 8 is a flow diagram showing the steps performed by an embodiment of the invention.
Figure 9:
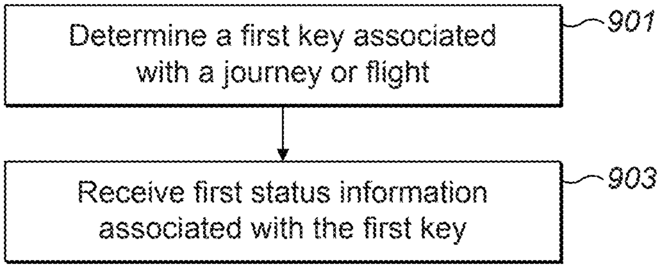
FIG. 9 is a flow diagram showing the steps performed by a further embodiment of the invention.

An embodiment of the invention will now be described referring to the architecture view of FIG. 1 of the drawings and the flow charts of FIGS. 8 and 9.

In the schematic view of FIG. 1, the AODB systems (Airport/Airline Operational Database) contain the flight information as known to each airline/airport. Further, the adapters 101, 103, 105 may serve to connect the authoritative airport and airline systems to a Distributed Ledger Technology. These are often known as "An Oracle"—that is an authoritative trusted source of information to be stored on DLT.

Using a public or private (where permissioned access is provided, for example using a user name and password) DLT or Blockchain, digital records may be stored (such as a scanned bagtag), digital assets may be transferred (such as transfer flight-transfer bag), and smart contracts (WTR Record, Payment to PAX, or Bill to Airline) may be executed.

This data may be aggregated via Smart Contracts running on the DLT. The data may be merged into the existing data (if data already exists) and is then replicated across all nodes on the blockchain. A token (or a credit) is generated for each participating airline/airport who pushes updates into the system.

Data Acquisition

The first or second or third adapters are configured to read one or more syntax elements associated with the first status information, or second status information or third status information. The status information is usually arranged according to a first format and the adapters map or parse the syntax elements to a second format which is different from the first format.

Each adapter is usually specific to the airline or airport data source. Each data source the adapter calls usually has a different endpoint, a different data format and a different mechanism to call the service. The adapter is usually configured to make a specific call to the airline or airport data source. The adapter is also able to parse and convert the data from this data source into the standard ACRIS json data format.

As an example, the LHR Adapter may make a SOAP XML Web Service call over HTTPS to the LHR endpoint. The web service call is protected by an API Key token, and this token is usually be added as part of the service call. The LHR service returns information associated with one or more flights, in XML format. The LHR Adapter usually then converts this XML data into the ACRIS standard data format. The adapter then stamps the data with the LHR keys so that the Smart Contract on the blockchain can verify that LHR is the source of this data. Each adapter has its own unique key, identifying the airline or airport.

Unique Journey Identifier

Depending upon the particular number of flights being operated by from an origin or to a destination, a flight may be uniquely identified by appending any one or more of the following fields:

- Scheduled departure date, which may be represented by a syntax element "originDate"
- Departure airport, which may be represented by a syntax element "departureAirport"
- Operating airline, which may be represented by a syntax element "operatingAirline.iataCode"
- Operating flight number, which may be represented by a syntax element "flightNumber.trackNumber"

For example identifier "2017-04-01LHRBA0122"—identifies BA Flight 122, from LHR departing on 2017 Apr. 1. In a further example, the alpha-numeric string "2017-05-05LHRBA0734" may uniquely identify a flight number 0734 departing from London Heathrow on 5 May 2017, and which is operated by British Airways. Thus, the key may be defined by data defining a departure airport or origin of the journey, and preferably data defining a departure date associated with the journey, and further preferably data defining an operator or provider of the journey as well as an optional flight or journey number.

This is known as the unique key for the flight, although the unique key is not shown in FIG. 1. When one of the adapters 101, 103, 105 pushes a flight to the blockchain, embodiments of the invention may provide functionality in a computer, server or system to generate the unique key for the flight and search the blockchain for a matching flight. This functionality may be implemented by any one of the functional components shown in FIG. 1. If no flight exists, then the ACRIS data is published as is to the blockchain and a new flight record is created. If there is a flight, then the flight data is retrieved from the blockchain, and the data merge process starts.

Description of the Merge Process

As noted before, each entity in the system (airline, departure airport, arrival airport) only has a partial view of the data and information from each source needs to be combined into the single view. Some examples:

- An airline initially publishes a flight schedule. This will include basic information such as departure/arrival airport, scheduled departure and arrival times and the flight number.
- As time of departure approaches (typically within 24 hours), the departure airport will assign check in desks, departure gates. The arrival airport will also assign arrival gates and baggage carousel information.
- During the life of a flight there will be many updates to this information, reflecting the changing operational events at both airports and within the airline (and external sources, such as Air Traffic Control strikes).

A computer, server or system embodying the invention may, in the smart contract, combine the partial data from these different sources into a single authoritative flight information data set. The system usually also applies rules in the smart contract to eliminate invalid updates and arbitrate between potentially conflicting updates. An example of an invalid update would be an airline attempting to update the flight status for a flight it is not operating. E.g. British Airways cannot update flight info for a Ryanair flight.

Another example would be an airport attempting to update data for a flight not passing through that airport. On a flight from Heathrow to Dublin airport, Amsterdam airport cannot send updates for that particular flight. The computer, server or system embodying the invention may implement functionality which ensures that the smart contract functionality identifies these updates and prevent them from being written to the blockchain if necessary.

There are other data updates which require arbitration—this is when conflicting updates come from entities which are entitled to update data on a flight. For example an airline and airport could end up in a cycle of conflicting Estimated Departure time updates—the smart contract functionality determines which is correct and which should be written as the authoritative update onto the DLT. Embodiments of the invention may provide the following functional solutions to this:

Last in is authoritative. This is an algorithm which makes no attempt to determine correctness and simply determines that the most recent update is the most authoritative.

Weighted authority. This algorithm gives a higher weighting to some fields, depending on the source. For example an airport update to gate information is given precedence over an airline update to the same information.

The rules implemented by one of the nodes 119, 121, 123 or gateways 131, 133, 135 implemented on a computer processing device may be defined according to any one or more of the following:

1. Any entity (airline or airport) can publish a new flight onto the blockchain. This entity can publish all data about the flight, no logic rules for restricting updates should apply at the flight creation phase.
2. The passengers object will be passed in clear text, and is usually encrypted before storage on the blockchain, and should be visible only to entities related to the flight.
3. In one specific example, the following fields cannot be changed by anyone:
   originDate
   departureAirport
   operatingAirline
   flightNumber
   departure.scheduled
   arrival.scheduled
4. The airline can update any fields (except the fields listed in #3)
5. After the flight is created, the departure airport can update any fields, except
   the fields listed in #3
   The arrival object
6. After the flight is created, the arrival airport can update any fields, except
   the fields listed in #3
   The departure object

Credits/Tokens

There is a concept of tracking which entity (airline, airport) contributed the most valuable data for the flight. Each time an entity pushes a valid flight update into the system, that entity is credited with a token. This allows the system to track who is contributing the most work to keeping the flight data up to date. In the scenario where access to the data is monetised, these tokens can be used at a later stage to identify who should get paid, and what amount that entity should get paid.

Mapping Data From Multiple Sources

The following disclosure provides a sample of the different data sources, and how they may be merged according to embodiments of the invention.

1. Table 1 below shows sample data from an airline. Note this data contains no departure gate/terminal information, or any arrival gate/terminal information. This is because the airline does not manage this information, and it is often not assigned until approaching departure (within 24 hours). Whereas an airline scheduled is specified up to twelve months in advance.

TABLE 1

Sample JSON data from an airline which may be defined as key-value pairs or syntax elements and associated data values.

```
{
  “MarketingCarrierCode”: “BA”,
  “FlightNumber”: 1476,
  “Sector”: {
    “DepartureStatus”: “Estimated”,
    “ArrivalStatus”: “Estimated”,
    “DepartureAirport”: “GLA”,
    “ArrivalAirport”: “LHR”,
    “ScheduledDepartureDateTime”: “2017-04-24T10:00:00”
    “ScheduledArrivalDateTime”: “2017-04-24T11:30:00”,
    “ReportedDepartureDateTime”: “2017-04-24T10:00:00”,
    “ReportedArrivalDateTime”: “2017-04-24T11:33:00”
    “OperatingCarrierCode”: “BA”,
    “AircraftTypeCode”: 319,
    “MatchesRequest”: true
  }
}
```

2. Table 2 below shows sample data from arrival airport. This data is in XML format (as opposed to the json data from the airline). Also, because this is the arrival airport, there is no information about what time the flight departed (scheduled, estimated or actual). The arrival airport only knows when a flight is due to land, and at what gate/terminal. Also note that the airport has a different equipment type to the airline (319 vs 320). This will need special handling in the merge (phase 3)

TABLE 2

Sample XML from an arrival airport which may be defined as key-value pairs or syntax elements and associated data values.

```
<flight>
  <flightIdentifier>BA1476</flightIdentifier>
  <flightNumber>1476</flightNumber>
  <airlineIataRef>BA</airlineIataRef>
  <aircraftEquipmentIataRef>320</aircraftEquipmentIataRef>
  <origin>
    <airportIataRef>GLA</airportIataRef>
  </origin>
  <destination>
    <airportIataRef>LHR</airportIataRef>
    <terminalCode>5</terminalCode>
    <terminalCode>22</terminalCode>
    <status code=“LD” statusTime=“2014-07-11:30:00.000Z”>
      <interpretedStatus>Landed 11:30</interpretedStatus>
      <category>INFO</category>
      <messages>
        <message>
          <text>Landed</text>
          <data>11:28</data>
        </message>
      </messages>
    </status>
    <scheduledDateTime>
      <utc>2017-04-24T11:30:00.000</utc>
      <local>2017-04-24T11:30:00.000</local>
      <utcOffset>0</utcOffset>
    </scheduledDateTime>
```

TABLE 2-continued

Sample XML from an arrival airport which may be defined as key-value pairs or syntax elements and associated data values.

```
  </destination>
  <stops count="0"/>
  <isHadacabCancelled>false</isHadacabCancelled>
</flight>
```

3. Table 3 below shows the resulting merged data set. It is in the ACRIS data standard, which contains elements for arrival and departure data. This json data contains the merged data from the airline and arrival airport for this specific flight. In addition, the logic of merging data assumes that where there is a difference in data over certain elements (in this case the aircraft equipment), the airline data takes priority as the airline controls the aircraft used and may have had to make a late change which the airport is unaware of. Also, data has been augmented with other external data sets. Whereas the above data just has the IATA code for the airline, the merge process is also able to lookup other code standards (in this case ICAO) and pull in a usable name for the airline. This further improves the quality of the data.

TABLE 3

A sample merged JSON data set. This may be defined as key-value pairs or syntax elements and associated data values.

```
{
  operatingAirline: {
    iataCode: "BA",
    icaoCode: "BAW",
    name: "British Airways"
  },
  aircraftType: {
    icaoCode: "A319",
    modelName: "319",
    registration: ""
  }
  flightNumber: {
    airlineCode: "BA",
    trackNumber: "1476"
  },
  departureAirport: "GLA",
  arrivalAirport: "LHR",
  originDate: "2017-04-24",
  arrival: {
    scheduled: "2017-04-24T10:30",
    actual: "2017-04-24T10:30",
    terminal: "5",
    gate: "22",
    baggageClaim: {
      carousel: ""
    }
  },
  flightStatus: "Landed",
  via: [ ]
}
```

Functionality of Nodes 119, 121, 123

These usually comprise further code or logic configured to perform a specific function, such as the functionality of a smart contract. Usually, one or more of the nodes 119, 121, 123 comprises code which determines whether a write request, received from one of the adapters 101, 103, 105 via a wired or wireless secure link such as HTTPS, should be allowed or denied. This functionality, may be referred to as gateway, gatekeeper or rules engine, not shown in FIG. 1 of the drawings, which determines when a request to write data to a database, should be allowed, and when a request to write data to the database should be denied.

Each gateway 131, 133, 135 may be configured to perform the following functionality. This description of an embodiment of the invention focuses on the functionality of one of the gateways 131, 133, 135. Usually, each node 119, 121 and 123 adopts the same or similar functionality to the gateway as that described below. Thus, the functionality of each gateway 131, 133, 135 may be implemented on a respective node 119, 121, 123.

Each of the adapters may 101, 103, 105 periodically push determined status information to a respective node 119, 121, 123 via the wired or wireless links 151, 153, 155, such as HTTPS. This is usually in response to the polling of, by one of the adapters 101, 103, 105, one of the respective databases 107, 109, 111 which may be associated with each adapter. The status information data, pushed from one of the adapters 101, 103, 105 to one of the nodes 119, 121, 123 or gateways 131, 133, 135 is usually encrypted using one of the keys 125, 127, 129 shown in FIG. 1. The data may be pushed using a REST API call which may include one of the keys, as previously described. Usually, each of the keys 125, 127, 129 used to sign the data is either a public or private key. Further, each of the keys 125, 127, 129 is usually different. Further each key 125, 127, 129 may be used to identify the source or origin of the data. The key may uniquely identify the origin or source of the data stored in databases 107, 109, 111. In one specific example, each of the adapters is configured to poll a particular database 107, 109, 111 at a particular frequency.

A first adapter 101 may be configured to poll a first database at a first frequency. A second adapter 103 may be configured to poll a second database 109 at a second frequency. A third adapter 105 may be configured to poll a third database 111 at a third frequency. The third frequency may be more frequent of less frequent than the first frequency or second frequency, depending upon the implementation. The first frequency may correspond or be substantially equal to the second frequency.

Each adapter then receives status information data from one of the data sources. The data may be transmitted according to XML or JSON data formats as previously described to each node.

In response, each of the nodes 119, 121, 123 or gateways 131, 133, 123 may generate a write command which may also be sent as part of the payload, requesting that the syntax elements defined in the status information are written to a database or one of the nodes 119, 121, 123. Usually, the data is periodically sent from each adapter 101, 103, 105 to a respective node 119, 121, 123, for example at a frequency of about 1 minute.

Accordingly, at step 801, one or more of the nodes 119, 121, 123 or gateways 119, 121, 123 receives data from a respective adapter 101, 103, 105. Usually, the data is signed by a key. One or more of the nodes 119, 121, 123 or gateways 119, 121, 123 then determines the identity associated with the data, or in other words, the origin of the data, at step 803. This may be performed using a key.

For example, in the embodiment of FIG. 1, the data stored in database 107 originates from or is associated with an airport, such as London Heathrow, LHR. The data stored in database 109 originates from or is associated with an airline, such as British Airways™. The data stored in database 111 originates from or is associated with a provider of flight status information data.

Each node 119, 121, 123 or gateway 131, 133, 135 may determine the identity associated with the data based on the keys 125, 127, 129 used by the adapters to sign the data. As described in further detail below, the gatekeeper blocks or allows a write request to a node or database based on one or more rules stored on each node. Usually, a single set of rules is provided and this is replicated over each node. However, different rules may in principle be provided for each data source.

Thus, each node 119, 121, 123 or gateway 131, 133, 135 may determine the identity associated with the data from the characteristics of how the data is signed. Because each key may be different, each node 119, 121, 123 or gateway 131, 133, 135 is able to determine what key has been used to sign the data, for example a key associated with British Airways, or a key associated with Dublin airport, or a key associated with London Heathrow airport.

Having determined, usually uniquely, the source of the data, each node 119, 121, 123 or gateway 131, 133, 135 searches the or a further database storing rules defining whether the request to write data to the database or node should be allowed or denied.

The specific detailed rules stored in the database or nodes 119, 121, 123 or gateways 119, 121, 123 are described in further detail below, but usually different rules are provided depending upon whether the status information or data is associated with a departure airport, or arrival airport or airline.

The rules define which of the syntax elements defined in the status information received by one of the nodes 119, 121, 123 or gateways 119, 121, 123 from one of the adapters 101, 103, 105 may be written or merged with the existing syntax elements stored in one of the nodes.

Based on the determined rules, each of the different syntax elements and origin of the data is checked with the rule. Write access to update each syntax element stored in the node is allowed or denied based on the rules, at step 805.

In a further aspect, one or more of the fields or syntax elements transmitted to or from any of the functional components shown in FIG. 1 may be encrypted.

In one specific example, syntax elements or data associated with an estimated departure schedule is public and may be signed with a public key. Thus, all parties with access to the virtual network 100 shown in FIG. 1 may decrypt this information.

However, certain fields or syntax elements associated with the status information may be encrypted with a private key. For example, the syntax element “passenger count on aircraft” may be secured by way of 3-way encryption.

Once specific application of this may be that an airport may need to determine the total number of passengers arriving, for example per flight or in a predetermined time period of on a particular date. Further, the airport may need to determined how many of those arriving passengers require a wheelchair.

This data may be provided by an airline source using one of the adapters, such as adapter 103, and may be included in the status information retrieved from database 109 and transmitted to the node 121, for example using transmission means or a transmitter. Thus, a private key or 3-way lock may be provided for example between a departure airport such as London Heathrow, an airline such as BA, and an arrival airport, such as Dublin so that one or more of the fields or syntax elements in the status information retrieved from the databases 107, 109, such as the passenger count or/and the number of wheelchair users is only visible to these three parties.

This means that even if a third party were to build an application to query the database stored on one of the nodes, they will not be able to decrypt particular syntax elements or field as these are protected from view by way of the 3-way lock. The 3-way lock or encryption using private key of certain data or syntax elements may be applied to other syntax elements which relate to sensitive data.

As previously described, embodiments of the invention pull flight data from multiple sources such as an airport 107, airline 109, and a flight information database 111. The data is subsequently stored on the blockchain or DLT. The data may be complete flight objects, or any one or more partial elements of a flight, such as any one or more of the data elements shown in FIGS. 2 to 7 of the drawings.

Further, a programming interface, such as API associated with database 111 may be provided which allows access to the merged data set, stored on the blockchain. The API may comprise functionality which allows a first key associated with a journey or flight to be determined based on one or more input data fields such as any one or more of the data uniquely identifying a particular flight or journey, as discussed above. This is shown as step 901 in FIG. 9 of the drawings. At step 903, first status information associated with the first key is retrieved from the block chain database or other database using the (unique) key.

The API may then retrieve any one or more of the data fields shown in FIGS. 2 to 7 from one of the database. Usually, one or more of the data elements shown in FIGS. 2 to 7 is output to a monitor, display, or display means to users of the system.

In some specific examples, each of the nodes 119, 121, 123 or gateways 119, 121, 123 may be configured to encrypt some fields stored in the database. A 3-way encryption algorithm may be used.

For example, fields which are not particularly sensitive, which might relate to general arrival or departure schedule information may be “public” and not necessarily encrypted.

However, some data may be stored as private data by encrypting it for example, using a 3-way encryption algorithm.

In one specific example, suppose the arrival airport is Dublin, and an adapter coupled to the Dublin database attempts to update a departure gate, then this update is rejected, because usually only the departing airport database or in other words the adapter coupled to the departing airport database is allowed write access to the database to update fields which only the departure airport is trusted to update. This preserves the integrity of the fields stored in the blockchain.

In this way, the adapter coupled to the departure airport database is usually only allowed to update information associated with the departure, and is not allowed, for example, to update any information associated with an arrival or information associated with passenger baggage.

Similarly, an adapter coupled to the arrival airport database is usually only allowed to update information associated with an arrival, and is not allowed to, for example, to update any information associated with a departure flight.

In this way, different subsets of the fields stored in the database may only be updated by certain adapters with data from a particular source, according to the defined access rules.

Flight Lifecycle

The flight lifecycle is the initial flight object and all the subsequent updates to a flight. The following example shows the type of updates which may be performed by embodiments of the invention according to which party is providing the data. The updates are presented in the typical order in which embodiments of the invention process the data.

Airline Based Update #1:
- An airline publishes scheduled flight information (flight number, departure/arrival airports, departure/arrival date/time)

Departure Airport Based Update #1:
- The departure airport updates this flight with check in desk information
- The departure airport updates this flight with departure terminal/gate information Airline Based Update #2:
- The airline updates with estimated departure time Arrival Airport Based Update #1:
- An arrival airport updates this flight with arrival gate Departure Airport Based Update #2:
- The departure airport updates this flight with actual departure time Arrival Airport Based Update #2:
- Arrival airport updates this flight with actual arrival time
- Arrival airport updates this flight with baggage carousel

Data Format

The flight data is passed into the blockchain using ACRIS data structure, with some additional fields added in this example.

Additional Fields

- passengers—this data structure contains data about the flights which indicates the number of passengers in each cabin, and the number of passengers requiring wheelchair assistance. The data is usually be encrypted and visible only to the relevant parties—namely the airline, the departure airport and the arrival airport.
- flightDataChanges—this data structure contains a history of all the changes. It is a part of the data structure for convenience only to help with debugging and to provide an easily accessible history of updates to the flight.

Any one or more of the data fields previously described may be stored in a SITA database 111. Usually, an API is provided which allows the database to be queried so that the additional field data may be retrieved from the database 111.

From the foregoing, it will be appreciated that embodiments of the invention may use a permissioned blockchain or DLT which uses a Smart Contract to merge data and arbitrate when there is conflicting data. Data from airline and airport AODB systems is merged and stored on blockchain. Usually, blockchain nodes exist at SITA, IAG and LHR data centres.

FIGS. 2 to 7 of the drawings provide an illustration of the update process of the database or blockchain with data, such as status information. In this specific example, the data is associated with a particular flight, BA0724 from London Heathrow, LHR, to Geneva, GVA, with a scheduled departure of 06:45, and arrival of 09:20, also showing that the flight has departed.

The actual departure time is shown as 06:43 from Terminal 5, Gate B:38. The estimated arrival time of 09:35 at Terminal 1 is shown and no arrival gate has yet been assigned.

Figure 2:
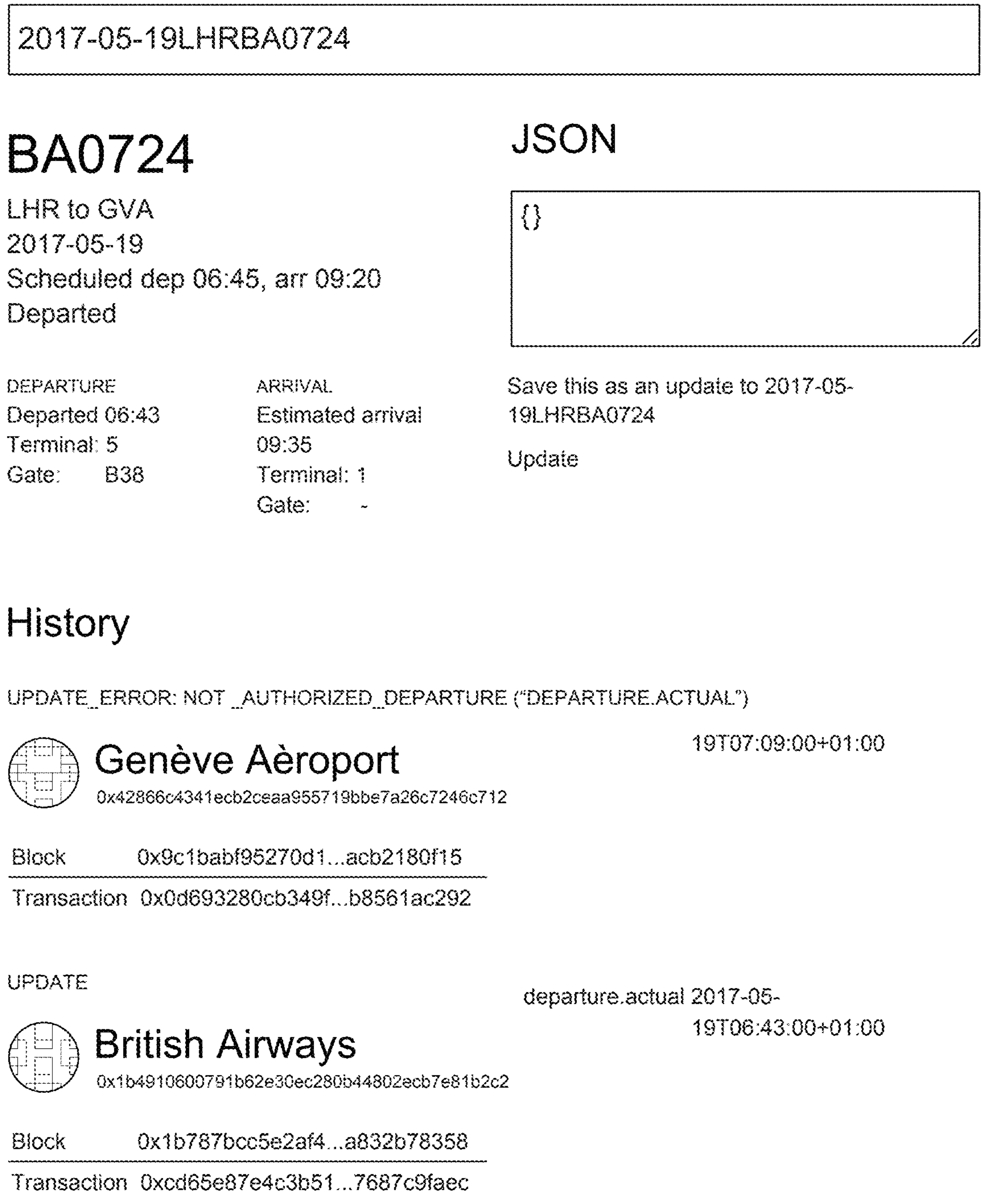
FIG. 2 shows exemplary status information and sources of data.
Figure 4:
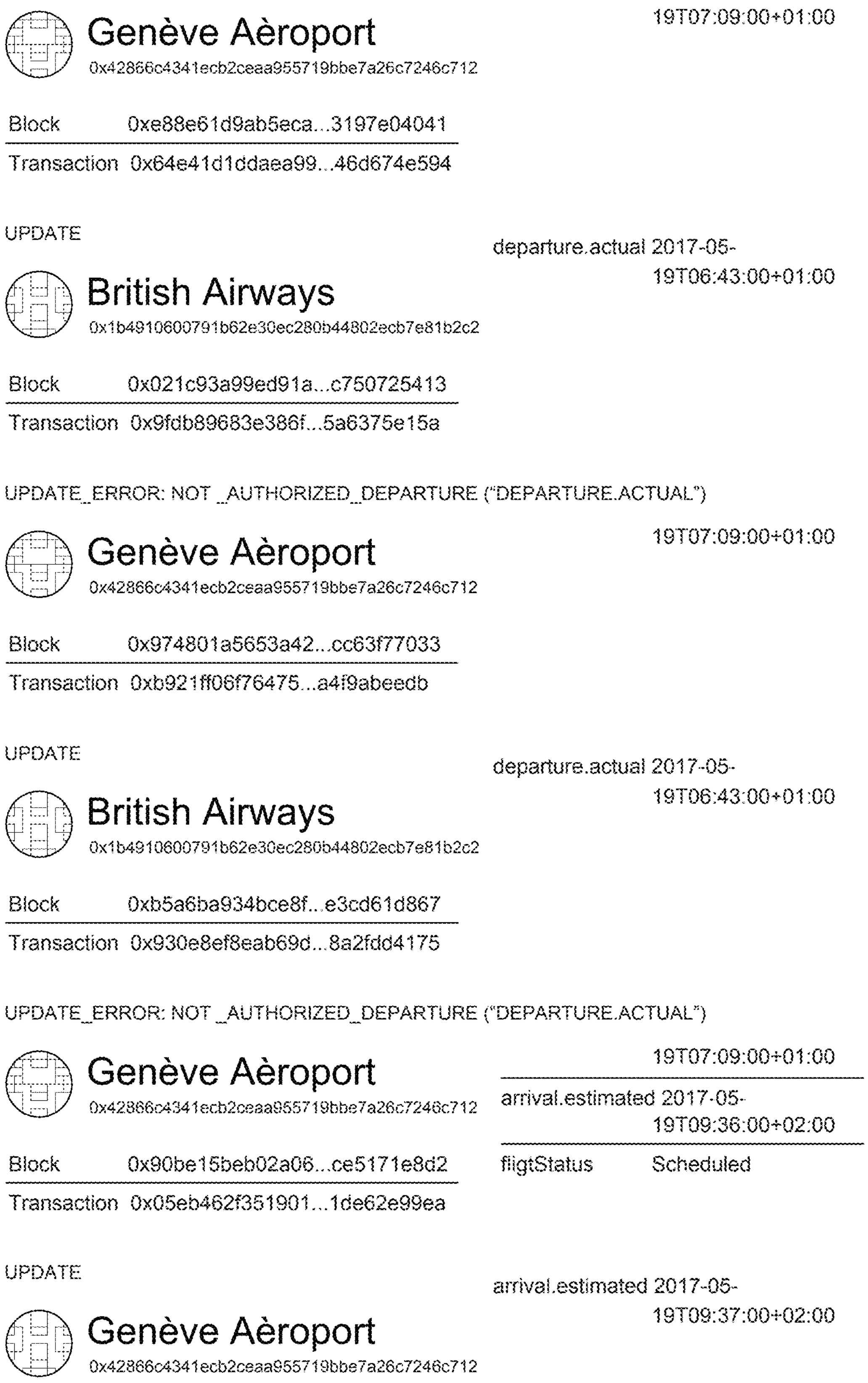
FIG. 4 shows exemplary status information and sources of data.

In FIG. 2, the updating status or history is shown. For example, this shows that the arrival airport, GVA has attempted to updated the actual time, and that this update was not authorised or allowed. In contrast, is shows at the bottom of FIG. 2 that the airline was allowed or authorised to update the data with an actual departure time of 06:43. Similarly, FIGS. 3 to 6 show examples of particular data sources attempting to update data stored in a database, and examples where the data write has been allowed or denied. FIG. 7 shows some exemplary fields or syntax elements The flowchart of FIGS. 8 and 9 illustrates the operation of an example implementation of systems, methods, and computer program products according to various embodiments of the present invention. Each block in the flowchart or block diagrams may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

From the foregoing, it will be appreciated that the system, device and method may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C #, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media. The following numbered clauses provide further description of the invention:

1. A computer processing device (119, 121, 123, 131, 133, 135) for determining whether to allow or deny access to a database or a storage means associated with the device, the device comprising:
   a. receiving means for receiving data in particular status information,
      wherein the data is signed with a key;
      wherein the device is configured to:
      i. determine the origin of the data by comparing the key to one or more keys stored in the database or storage means, to identify the source of the data;
      ii. search the database or storage means to determine one or more access rules associated with the source of the data, wherein the access rules define whether write access to the database or storage means is allowed or denied for the data; and
      iii. allow or deny write access to the database or storage means based on the determined rule or rules.
2. The computer processing device of clause 1 wherein the data comprises a plurality of different fields and wherein the database or storage means comprises a plurality of different fields.
3. The computer processing device of clause 2 wherein one or more different access rules are provided for at least two or more of the different fields.
4. The computer processing device of any preceding clause wherein the data is associated with a journey or flight between an origin A, and destination B.
5. The computer processing device of any preceding clause further configured to allow or deny access to a subset of the fields stored in the database or storage means based on the determined rule or rules.
6. The computer processing device of any preceding clause further configured to encrypt one or more of the fields associated with the received data based on one or more encryption rules stored in the database or storage means, and preferably wherein the encryption is performed using 3-way encryption.
7. A computer processing device for determining status information associated with a journey between an origin, A, and destination, B, the device comprising:
   a. a first adapter configured to:
      determine a first key associated with the journey or flight; and
      receive first status information associated with the first key.
8. The computer processing device according to clause 1 wherein the device further comprises:
   a. a second adapter configured to:
      i. receive second status information associated with the first key wherein the second status information is different from the first status information.
9. The computer processing device according to clause 2 wherein the device further comprises:
   a. a third adapter configured to:
      i. receive third status information associated with the first key wherein the third status information is different from the first status information and the second status information.
10. The computer processing device according to any preceding clause wherein a first set of rules are associated with the first status information, wherein the rules define which of one or more flight status information syntax elements stored in a database may be updated by the first adapter.
11. The computer processing device according to any preceding clause wherein a second set of rules are associated with the second status information, wherein the rules define which of one or more flight status information syntax elements stored in a database may be updated by the second adapter.
12. The computer processing device according to any preceding clause wherein a third set of rules are associated with the third status information, wherein the rules define which of one or more flight status information syntax elements stored in a database may be updated by the first adapter.
13. The computer processing device according to any preceding clause wherein the first key allows access to a database associated with an airline or airport.
14. The computer processing device according to any preceding clause wherein the processor is further configured to perform a service call to a database associated with a transportation hub, and preferably wherein the service call is a SOAP XML Web service call communicated using a secure transfer protocol or a rest API call.
15. The computer processing device according to any preceding clause wherein the service call comprises the first key.
16. The computer processing device according to any preceding clause wherein any one or more of the first status information and second status information and third status information comprise data defining different aspects of status information in particular departure airport, departure gate, arrival airport, arrival gate, flight schedule information associated with an airline and preferably wherein the data is formatted according to and alpha-numeric data format such as an XML or JSON data format.
17. The computer processing device according to any preceding clause wherein the first or second or third adapters are configured to read one or more syntax elements associated with the first status information, or second status information or third status information, wherein the status information is arranged according to a first format and to map the syntax elements to a second format which is different from the first format.

18. The computer processing device according to any preceding clause wherein any one or more of the first adapter, second adapter or third adapter is configured to stamp any one or more of the first status information, second status information and third status information with the first key.

19. The computer processing device according to any preceding clause wherein each of the first, second or third adapter 101, 103, 105 or nodes 119, 121, 123 is configured to merge the received first status information and second status information and preferably third status information into aggregated data, the aggregated data preferably comprising an alpha-numeric format.

20. The computer processing device according to clause 1 wherein any one or more of the first adapter, second adapter or third adapter is further configured to receive flight status data comprising any one or more syntax elements defining:

a scheduled departure or/and arrival time;

an estimated and actual departure/arrival times;

a departure gate or/and terminal associated with an airport;

an arrival gate or/and terminal associated with the or an airport;

a baggage carousel number associated with an arrival airport a flight status information in particular data defining a flight as delayed or go to gate or boarding or closing; and an aircraft type and tail number.

21. The computer processing device according to any preceding clause wherein the processor is further configured to determine whether any one or more of the or further syntax elements associated with the first status information and second status information and preferably the third status information match based on a comparison of syntax elements.

22. The computer processing device according to any preceding clause wherein the processor is further configured to rationalise one or more of the determined matching syntax elements by selecting only one of the matching syntax elements associated with one of the first or second or third flight status information and preferably discarding matching syntax elements associated with the other flight status information.

23. The computer processing device according to any preceding clause wherein the processor is further configured to transmit the aggregated data or any one of the first status information and second status information and third status information to one or more nodes (119, 121, 123) or further computing device associated with a distributed ledger and wherein the aggregated data or data is periodically transmitted.

24. The computer processing device according to any preceding clause wherein the computing device or the further computing device or node is configured to generate a unique key for the flight based on any one or more of data defining a scheduled departure date, a departure airport, an operating airline and an operating flight.

25. The computer processing device according to any preceding clause wherein the further computing device or node searches the or a further database for data matching the unique key for the flight.

26. The computer processing device according to any preceding clause wherein the further computing device or node creates a flight record comprising any one or more of data defining a departure schedule, arrival schedule, operating date, operating airline, flight number, departure airport and arrival airport and preferably wherein the flight record is only created if the database does not comprise data matching the unique key for the flight and stores the aggregated data in the flight record in the database.

27. The computer processing device according to any preceding clause wherein the processor is further configured to send the aggregated data to a display at an airport wherein the displayed status information comprises data defining the status of a flight in particular alpha numeric text comprising any one or more of data defining whether a flight is delayed, boarding, or closing or whether a passenger associated with the flight should go to a predetermined gate number.

28. A method for determining status information associated with a journey between an origin, A, and destination, B, the method comprising the steps of any preceding clause.

29. A computer program product which when executed performs the method of any preceding clause.

30. A device for determining status information associated with a journey between an origin, A, and destination, B, the device comprising:

a. means for determining a first key associated with the journey or flight;

b. means for receiving first status information associated with the first key.

The invention claimed is:

1. A system for data processing comprising at least one processor and a memory storing instructions which, when executed by the at least one processor, cause the processor to:

determine from a first data set associated with a first data source, a first unique key associated with the first data source wherein the first data set comprises a plurality of different first data elements;

determine from a second data set associated with a second data source, a second unique key associated with the second data source wherein the second data set comprises a plurality of different second data elements, wherein the first data set and second data set share at least one common data element and wherein at least some of the first data elements are different from the second data elements;

parse and convert, via at least one adapter, the data sets into a standard format;

stamp the first data set with the first unique key and the second data set with the second unique key;

verify the first data source and second data source based on the keys;

combine the first data set and second data set in to an aggregated data set if each data source is verified as the source of the data;

determine, based on one or more access rules associated with each data source, whether each data source is entitled to update one or more of the data elements associated with each of the first data set and second data set; and in response to determining, based on the one or more access rules, that the first and second data sources are entitled to update one or more of the same data elements common to the first and second data sets, arbitrate between updates from the data sources based on which update is the most recent in time or based on a weighting associated with each data element, wherein the weighting is dependent upon the data source.

2. The system of claim 1, wherein the at least one processor is further configured to:

determine from a third data set associated with a third data source, a third unique key associated with the third data source wherein the third data set comprises a plurality of different third data elements, wherein the first data set and second data set and third data set share at least one common data element and wherein at least some of the first data elements are different from the third data elements;

verify the third data source based on the third unique key; and combine the aggregated data set and the third data set if the third data source is verified as the source of the third data.

3. The system of claim 2, further comprising receiving means configured to receive the first data set from the first data source, and/or receiving means configured to receive the second data set from the second data source, and/or receiving means configured to receive the third data set from the third data source.

4. The system of claim 1, wherein each data element comprises a key-value pair.

5. The system of claim 4, further comprising determining whether the first data set and second data set include the same data elements.

6. The system of claim 5, wherein if it is determined that the first data set and second data set include the same common elements, weighting the values associated with the common elements based on the data source associated with the first data set and the data source associated with the second data set.

7. The system of claim 1, further comprising receiving an updated first data set at a first frequency and receiving an updated second data set at a second frequency.

8. The system of claim 7 wherein second frequency is higher than the first frequency.

9. The system of claim 1, wherein the first data source is associated with an origin of a journey, and wherein the second data source is associated with a destination of the journey.

10. A method for data processing comprising:

determining from a first data set associated with a first data source, a first unique key associated with the first data source wherein the first data set comprises a plurality of different first data elements;

determining from a second data set associated with a second data source, a second unique key associated with the second data source wherein the second data set comprises a plurality of different second data elements, wherein the first data set and second data set share at least one common data element and wherein at least some of the first data elements are different from the second data elements;

parsing and converting, via at least one adapter, the data sets into a standard format;

stamping the first data set with the first unique key and the second data set with the second unique key;

verifying the first data source and second data source based on the keys;

combining the first data set and second data set in to an aggregated data set if each data source is verified as the source of the data determining, based on one or more access rules associated with each data source, whether each data source is entitled to update one or more of the data elements associated with each of the first data set and second data set; and in response to determining, based on one or more access rules associated with each data source, that the first and second data sources are entitled to update one or more of the same data elements common to the first and second data sets, arbitrating between updates from the data sources based one which update is the most recent in time or based on a weighting associated with each data element, wherein the weighting is dependent upon the data source.

11. The method of claim 10, further comprising:

determining from a third data set associated with a third data source, a third unique key associated with the third data source wherein the third data set comprises a plurality of different third data elements, wherein the first data set and second data set and third data set share at least one common data element and wherein at least some of the first data elements are different from the third data elements;

verifying the third data source based on the third unique key; and combining the aggregated data set and the third data set if the third data source is verified as the source of the third data.

12. The method of claim 11, further comprising receiving the first data set from the first data source, and/or receiving the second data set from the second data source, and/or receiving the third data set from the third data source.

13. The method of claim 10, wherein each data element comprises a key-value pair.

14. The method of claim 13 further comprising determining whether the first data set and second data set include the same data elements.

15. The method of claim 14, wherein if it is determined that the first data set and second data set include the same common elements, weighting the values associated with the common elements based on the data source associated with the first data set and the data source associated with the second data set.

16. The method of claim 10, further comprising receiving an updated first data set at a first frequency and receiving an updated second data set at a second frequency.

17. The method of claim 16, wherein second frequency is higher than the first frequency.

18. The method of claim 10, wherein the first data source is associated with an origin of a journey, and wherein the second data source is associated with a destination of the journey.

19. A computer program product which, when executed by at least one computing device, causes the at least one computing device to perform the method of:

determining from a first data set associated with a first data source, a first unique key associated with the first data source wherein the first data set comprises a plurality of different first data elements;

determining from a second data set associated with a second data source, a second unique key associated with the second data source wherein the second data set comprises a plurality of different second data elements, wherein the first data set and second data set share at least one common data element and wherein at least some of the first data elements are different from the second data elements;

parsing and converting, via at least one adapter, the data sets into a standard format;

stamping the first data set with the first unique key and the second data set with the second unique key;

verifying the first data source and second data source based on the keys;

combining the first data set and second data set in to an aggregated data set if each data source is verified as the source of the data determining, based on one or more access rules associated with each data source, whether each data source is entitled to update one or more of the data elements associated with each of the first data set and second data set; and in response to determining, based on one or more access rules associated with each data source, that the first and second data sources are entitled to update one or more of the same data elements common to the first and second data sets, arbitrating between updates from the data sources based one which update is the most recent in time or based on a weighting associated with each data element, wherein the weighting is dependent upon the data source.

* * * * *